United States Patent Office
3,412,175
Patented Nov. 19, 1968

3,412,175
GRAFT COPOLYMERS OF FLUOROCARBON
GROUPS ON POLYAMIDE OR POLYESTER
SUBSTRATES
Eugene Edward Magat, Spring Valley, Wilmington, Del.,
and David Tanner, Charlottesville, Va., assignors to E. I.
du Pont de Nemours and Company, Wilmington, Del.,
a corporation of Delaware
No Drawing. Continuation-in-part of application Ser. No.
578,414, Sept. 9, 1966. This application Dec. 21, 1966,
Ser. No. 603,409
8 Claims. (Cl. 260—857)

ABSTRACT OF THE DISCLOSURE

A graft copolymer comprising a polyamide or polyester substrate having grafted thereto a fluorocarbon gives increased resistance to aqueous soil, oils, oily soil, and dry soil.

---

This application is a continuation-in-part of application Ser. No. 578,414, filed Sept. 9, 1966, which is a continuation of application Ser. No. 863,047, filed December 30, 1959 (now abandoned), which is a division of application Ser. No. 735,288, filed May 14, 1958, now U.S. Patent 3,188,228, which is a continuation-in-part of our abandoned applications Ser. No. 499,754, filed Apr. 6, 1955, and Ser. No. 503,790, filed Apr. 25, 1955.

This invention is concerned with fibers of synthetic polymeric esters and amides having grafted thereon fluorine-containing compounds.

Graft copolymers have been developed for many end uses. Grafted synthetic linear condensation polymers have been studied less extensively than the addition polymers, since the latter are especially adapted to grafting reactions requiring free radical activity, which may be present as a result of the polymerization process, or may be induced by activating residual unsaturated (double) bonds.

By means of these grafts, properties not normally found in condensation polymers may be provided. For example, increased reactivity, improved static resistance, resistance to hole melting and the like can be attained without significant loss in the properties of the substrate polymer.

Improved properties are achieved by the present invention which resides in a graft copolymer textile comprising (a) a synthetic linear condensation polymer substrate of polyamides or polyesters, and (b) grafted thereto, a compound from the group of (1) vinyl fluoride, (2) vinyl substituted fluorocarbon, (3) fluorocarbon alcohol, (4) fluorocarbon alcohol acrylate, (5) vinyl esters of fluorocarbon acid, (6) vinyl substituted fluorocarbon esters, or (7) fluorocarbon vinyl ethers, with the proviso that the fluorocarbon portion of the molecule of (3) to (7) contain from 2 to 17

groups.

The polyamide which serves as a substrate for grafting is a fiber-forming polyamide wherein the amide linkage is an integral part of the polyamide chain. Similarly, the polyesters are those wherein the ester linkage is an integral part of the polymer chain. The grafted polymer chains are bonded by carbon-carbon linkages to the substrate polymer backbone.

Saturated as well as unsaturated fluorine containing modifiers may be employed to form the graft copolymer of the instant invention. Although the unsaturated modifiers may have acetylenic unsaturation, modifiers containing at least one unit of ethylenic unsaturation are preferred, since these are most readily activated to initiate the grafting reaction. Such modifiers may be predominantly fluorocarbon, such as vinyl substituted fluorocarbon having from 2 to 17 —$CF_2$— groups. In addition, at least one carbon must bear at least one hydrogen substituent. Under processing conditions, shown in Example 4, vinyl fluoride may be employed.

For maximum resistance to oily soil, the modifier of types (3) to (7) should contain only one hydrogen on a carbon atom and the remaining carbon atoms should be completely fluorinated. Where reduced water wickability is required, some —$CH_2$— radicals may be present, as long as there are from 2 to 17 —$CF_2$— radicals.

Compounds useful in modifying condensation polymer substrates so that they are resistant to aqueous soil, oils, oily soil and dry soil are graft copolymers of unsaturated esters having the following structures:

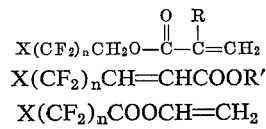

Also useful are unsaturated ethers having the following general structure:

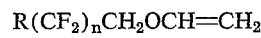

In these general formulas, X may be fluorine or hydrogen (when X is fluorine, the graft copolymer shows a higher degree of hydrophobicity and oleophobicity than when X is hydrogen), $n$ is 2 to 17, and R may be alkyl or hydrogen and R' may be alkyl. The lower alkyl groups are preferred, since long chain alkyls destroy oleophobic properties. The grafted fluorine-containing portion of the copolymer is usually located on the surface of the structure but may also be present throughout the body of the fiber.

It is also preferred that the compounds be of the omega-fluoro type. These are generally more effective than the omega-hydro compounds. It is also preferred for a high degree of oleophobicity that $n$ be at least 7.

The soil repellence of the fabrics of this invention may become evident in two ways. The grafted fabric may pick up less of the particular type of soil than unmodified control, or it may be whiter after standard soiling and laundering than control. Either type has specific utility, and some modifiers provide both.

In order to effectively decrease water wickability of condensation polymer fabrics, relatively small amounts of the fluorine modifiers need be grafted to the fiber; usually 0.5% by weight on the surface of the fiber will produce a beneficial effect. For maximum improvement in resistance to oily soil, from 2 to 20% by weight should be grafted.

Grafting is most conveniently initiated by high energy radiation, such as high energy electrons, X- or gamma-rays. The polymer substrate may be soaked in the modifier either as a liquid or as a solution and the combination irradiated in a single step operation. Alternatively, the polymer substrate may be irradiated at room temperature and then preferably substantially immediately, contacted with the modifier in a two-step process. A preferred embodiment of the two-step process is to irradiate the polymer below 10° C., preferably below 0° C. and then contact it with the modifier. Grafting occurs as the combination is warmed.

The polymer substrate may be grafted in the form of flake, if the modifier has sufficient thermal stability to withstand subsequent processing, by presoaking it in the solution so that sufficient modifier is absorbed to reach the desired weight level. The combination is then irradiated to induce grafting, after which the flake is washed, dried and spun to yarn. Preferably, fiber or fabric is treated after it has been spun or woven. This type treatment will usually result in a shorter soaking time due to the smaller dimensions of the substrate polymer. Flake treatment will usually give a greater thruput, promoting efficient use of radiation.

The invention is illustrated by the following examples but it is not liimted thereby. Unless otherwise indicated, weight percentages are intended. Irradiation doses are given in mrad. where 1 mrad. is equal to 1,000,000 rad.

EXAMPLE 1

Fabric samples of various description are soaked in a fluorocarbon alcohol, $HCF_2—(CF_2)_5—CH_2OH$. After removal of excess liquid by wringing, but while still wet, they are enclosed in separate aluminum foil wrappers and subjected to electron irradiation. Samples A to C are irradiated using a 1 mev. resonant transformer with a beam-out current of 560 microamperes, while Sample D is irradiated with 2 mev. electrons from a Van de Graaff accelerator at a beam-out current of 290 microamperes. In each case, a total dose of 33 mrad. is employed. An untreated control is similarly irradiated. Each sample is subjected to 15 standard washings using household detergent and hot tap water, then dried. Results of a subsequent test for water repellence are listed below in Table 1. In this test, the diameter of a 0.3 ml. drop of water placed on the fabric is measured after 60 seconds.

TABLE 1

| Fabric | Wettability [1] | | |
|---|---|---|---|
| | Treated Irradiated | Untreated Irradiated | Original |
| A. Polyethylene terephthalate, continuous filament | 0.3 | 1.5 | 1.5 |
| B. Polyethylene terephthalate, staple | 0.3 | 1.5 | 1.5 |
| C. Polycaproamide, continuous filament | 0.3 | 1.5 | 1.5 |
| D. 66 nylon, continuous filament | 0.3 | 1.5 | 1.5 |

[1] Drop diameter in inches after 60 seconds.

Analysis of the polyhexamethylene adipamide Sample D shows a fluorine content of 3.4%, which corresponds to about 4.9% (on weight of nylon) of the original modifier grafted to the fabric.

Four swatches of Sample D are subjected to Wagg test for oily soil. A comparative control of ungrafted nylon is included. The average percent of the original fabric reflectance retained after soiling and after soiling and washing are listed in Table 2.

TABLE 2

| Sample | Grafted Nylon D | Nylon Control |
|---|---|---|
| Percent Reflectance Retained: | | |
| After soiling | 60.3 | 44.8 |
| After soiling and washing | 91.8 | 83.1 |

It is noted that Sample D is superior to unmodified nylon because of decreased pickup and more complete removal of oily soil.

EXAMPLE 2

Following the irradiation procedure described hereinabove, a fluorinated hydrocarbon is grafted to nylon and polyethylene terephthalate fabrics, as indicated in Table 3. The increase in water repellence is indicated by the increased length of time required for a drop of water placed upon the fabric to disappear. Values for comparative unmodified controls are included in Table 3.

TABLE 3

| Compound Grafted | Weight Gain, Percent | Wickability, drop life in sec. |
|---|---|---|
| 66 nylon fabric: | | |
| None | ([1]) | 600–700 |
| 2,2,3,3-tetrafluorocyclobutylvinylethyne | 6.2 | 6,100 |
| Polyethylene terephthalate fabric: | | |
| None | ([1]) | 1,400–2,300 |
| 2,2,3,3-tetrafluorocyclobutylvinylethyne | 3.9 | 5,300 |

[1] Control.

By this process, certain fluorine containing compounds are grafted to fabrics of condensation polymer whereby the fabrics are rendered permanently resistant to wetting or soiling with oils, hydrocarbons and other common organic solvents, as well as being water-repellent. This modification is illustrated by the following example.

EXAMPLE 3

A scoured nylon taffeta Sample A is soaked for 15 minutes at room temperature in 20 ml. of an 8% diethyl ether solution of alpha, alpha-dihydroperfluorooctyl acrylate, which had been prepared as described in Example 4 of U.S. Patent 2,642,416. After soaking for 15 minutes at room temperature, the nylon sample is irradiated, while wet, with 2 mev. electrons for a dosage of 3 mrad. After cooling, another 20 ml. portion of the 8% solution is added, followed by a second irradiation using the same dose; the process is repeated a third time to give a total dosage of 9 mrad. A total of 60 ml. of the 80% solution is used. The sample is then extracted for 24 hours with each of the following solvents; tetrahydrofuran, carbon tetrachloride, perchloroethylene, and dimethylformamide; the sample is then boiled for 8 hours in 0.3% "Tide" solution. After these extractions, the sample is tested for oil repellency using the following test:

Drops of mixtures of a mineral oil (Nujol) and n-heptane are placed on the fabric, and the composition is noted which contains the highest percentage of n-heptane which does not wet the fabric under the drop. The rating corresponding to that composition is considered the oil repellency of the sample.

Oil repellency rating scale

| Oil repellency rating: | Percent n-heptane in mineral oil-heptane mixture |
|---|---|
| 100 | 60 |
| 100 | 50 |
| 90 | 40 |
| 80 | 30 |
| 70 | 20 |
| 50 | 0 |
| 0 | ([1]) |

[1] No holdout to mineral oil.

A rating of 100+ is observed for A, vs. a rating of 0 for an untreated nylon control, B. When a nylon Sample C is treated with the polymer of the above perfluorooctyl acrylate, without irradiation, a rating of 100+ is observed; however, after four 15-minute washes in household detergent using hot tap water (a less severe treatment than given to A), the rating drops to 0.

The test is repeated, using a fabric of polyethylene terephthalate taffeta, wherein soaking is carried out for 15 minutes at room temperature, followed by slowly raising the temperature to 95° C. in a system sealed to prevent escape of monomer. The material is irradiated at this temperature to a dose of 5 mrad. The process is repeated three times, as before. After extraction for 25 hours using carbon tetrachloride solvent, similar oil repellency is observed.

Grafted fluorocarbon compounds are also useful in imparting resistance to soil, and improving ease of soil, and improving ease of soil removal, as shown by nylon Sample D which is soaked in a solution of 20 parts ethyl 2,3,8-trihydroperfluorohepten-2-oate, 20 parts water and 60 parts methanol, and nylon Sample E, which is soaked in a 20% solution of perfluoroheptene-1 in ether.

The perfluorohepten-2-oate is prepared as follows, using the synthesis of McBee.

In a 300 ml. three-necked flask fitted with a stirrer, funnel and condenser, 13 grams (0.125 mol) malonic acid is added to 100 ml. pyridine. The mixture is stirred at room temperature while 28 grams of $C_5$ aldehyde in 100 ml. of toluene is added. After completing the addition, the mixture is refluxed for 6 hours, cooled and poured onto 400 grams of ice and 50 ml. of concentrated sulfuric acid. Three layers form; both the lighter and heavier water layers are shown to contain product. They are removed, combined and evaporated under vacuum. The oil is taken up in bicarbonate and ether, washed twice and acidified, and is then shaken with three 100 ml. portions of ether. The ether solution is dried and the ether evaporated to give crude, solid acid. Recrystallized from benzene, white cubic crystals of 3-hydroxyoctafluoroheptanoic acid are obtained melting at 63–64° C. (weight 21.6 grams, 62.9% yield).

The acid is esterified by refluxing with 20 ml. absolute ethanol and 40 ml. benzene in a flask fitted with a Dean-Stark water trap. One gram of para-toluenesulfonic acid is added. The reaction is completed in 12 hours and the mixture is evaporated in vacuum to remove alcohol and benzene (91% yield).

Crude ester from all sources (56 gm.) is then distilled in a spinning band column to yield 46 grams of product boiling at 130° C., 122 mm.

The hydroxy ester is dehydrated by mixing 11 grams of phosphorus pentoxide with the ester and distilling through a spinning band column at reduced pressure. The ethyl octafluorohepten-2-oate obtained has a boiling point of 92° C., under 28 mm. pressure.

The perfluoroheptene is prepared by a method analogous to that described by La Zerte, Hals, Reid and Smith, Jour. Am. Chem. Soc., 75, 4525 (1953), for the homologous perfluorobutene.

The soaking, irradiation and extraction procedure used for Sample A is repeated for D and E. These samples, along with non-irradiated control B, are then subjected to a standard laboratory soiling test, with the results shown in Table 4.

TABLE 4

| Sample | B (Control) | D | E |
|---|---|---|---|
| Radiation dose, mrad | (4) | 9.0 | 9.0 |
| Wt. gain, percent | (4) | 4.3 | 3.0 |
| Reflectance, percent [1] | | | |
| Wagg oily soil: [2] | | | |
| Before washing | 25.6 | 32.5 | 29.3 |
| After washing | 51.4 | 63.8 | 65.4 |
| Lambert Dry Soil: [3] | | | |
| Before washing | 33.0 | 39.4 | 35.0 |
| After washing | 86.6 | 92.2 | 90.7 |

[1] Reflectance gives percent of original light reflectance retained after the indicated treatment; all original reflectance measurements taken after two soiling cycles.
[2] Wagg oily soil test is described by R. E. Wagg, J. Tex. Inst., 1952, T 515; this soil corresponds to soil from the skin, and to extraneous grease and oils.
[3] Composition and procedure of Lambert dry soil given by: H. L. Sanders and J. M. Lambert, J. Am. Oil Chem. Soc., 5, 153–159 (1950) May; this soil corresponds to vacuum cleaner soils.
[4] None.

EXAMPLE 4

66 nylon taffeta swatches are irradiated in a $N_2$ atmosphere with 2 mev., electrons at about —80° C. The irradiation dose is 25 mrad. The irradiated fabrics are then sealed in a precooled pressure bomb containing 150 ml. of 4% aqueous soap solution. Hexafluoropropene is injected into the bomb, and the temperature is raised to 70° C. After 24 hours, the swatches are removed, extracted with (1) soapy $H_2O$, (2) $H_2O$, (3) acetone, (4) tetrahydrofuran in that order, and subjected to the test for oily soil, with the results shown in Table 5. An ungrafted control is also exposed to the soiling test. The test is repeated, using 5% aqueous sodium carbonate in the bomb, and pressurizing the bomb to 3500 p.s.i.g. with vinyl fluoride. The mixture is heated to 80° C. for 13 hours. After removing ungrafted materials by extraction with tetrahydrofuran, a weight gain of 25% is observed. These samples are also subjected to the Wagg oily soil and the Lambert dry soil with the results shown in Table 5.

TABLE 5

| | | Percent Reflectance | | | |
|---|---|---|---|---|---|
| | Modifier | Oily Soil | | Dry Soil | |
| | | Before wash | After wash | Before wash | After wash |
| Sample: | | | | | |
| A | 5.7% hexafluoropropene | 36.1 | 70.3 | 37.9 | 97.8 |
| B | 25.0% vinyl fluoride | 42.2 | 72.3 | 39.1 | 97.0 |
| C | None (control) | 29.4 | 54.9 | 34.7 | 89.5 |

EXAMPLE 5

The product of this invention may be prepared by grafting an unsaturated compound to the substrate polymer, then reacting the fluorine-containing compound with it in a subsequent step.

66 nylon fabric is soaked for 24 hours in freshly distilled vinyl acetate, then the combination is irradiated with 2 mev. electrons to a dose of 3 mrad. Ungrafted monomer and polymer are removed by extracting for 24 hours with acetone. The polyvinyl acetate graft is then hydrolyzed to the alcohol by boiling for 1 hour in 0.2 N sodium hydroxide. The weight gain due to grafted vinyl alcohol is 9.7%. The polyvinyl alcohol graft is then esterified by boiling the fabric for 4 hours in a solution containing 5.0 gm. perfluorooctanoic acid, 0.5 gm. p-toluenesulfonic acid, and 100 ml. dioxane and 52 ml. $H_2O$. After rinsing in methanol, the grafted fabric is extracted with tetrahydrofuran overnight. After drying, the fabric is subjected to the "oily soil" test with the results listed in Table 6. Results for a nongrafted nylon control of the same fabric construction are also included.

TABLE 6

| | Modifier | Percent Reflectance | |
|---|---|---|---|
| | | Before wash | After wash |
| Sample: | | | |
| A | Vinyl perfluorooctanoate | 39.4 | 81.6 |
| B | None (control) | 35.0 | 62.7 |

Method of application

The substrate polymer may be contacted with the modifier composition before or after irradiation, as already stated. It may be applied to the fiber as a liquid or vapor, or may be applied as a solution or an emulsion. When some penetration of the composition into the polymer is desired, choosing a solvent having a swelling effect on the substrate will increase the rate of diffusion. Pre-soaking in the modifier solution before irradiation will also enhance penetration. Alternatively, the polymer may be pre-swollen with swelling agent before contacting with the modifier composition. When contacting pre-irradiated substrate polymer, it is usually helpful to heat the modifier composition containing the pre-irradiated substrate to accelerate the reaction. This is especially helpful with polyethylene terephthalate, which grafts best at temperaures above 80° C. In general, however, temperatures of 50 to 150° C. are satisfactory.

It is within the scope of this invention to employ multifunctional unsaturated modifiers to produce some additional effect such as improved crease recovery, dyeability, flame resistance, improved hand, and the like, as long as the required concentration of grafter —$CF_2$— groups is also present.

It will often be desirable to soak and/or irradiate filaments under sufficient tension to keep them from shrinking. This will help maintain maximum fiber orientation.

Irradiation conditions

By "ionizing radiation" is meant radiation having sufficient energy to remove an electron from a gas atom, forming an ion pair; this requires an energy of about 32 electron volts (ev.) for each ion pair formed. This radiation has sufficient energy to non-selectively break chemical bonds; thus, in round numbers, radiation with energy of 50 electron volts (ev.) and above is effective for the process of this invention, although energies of 50,000 ev. and over are preferred. Both particle radiation and ionizing electromagnetic radiation are included.

The preferred radiation for the practice of this invention is high energy ionizing particle radiation; for maximum utility, when using this type of radiation, energy equivalent to at least 0.1 million electron volts (mev.) is preferred. Higher energies are even more effective; there is no known upper limit, except that imposed by available equipment.

The high energy particle radiation is an emission of highly accelerated electrons or nuclear particels such as protons, neutrons, alpha particles, deuterons, beta particles, or the like, directed so that the said particle impinges upon the polymer.

Similarly, ionizing electromagnetic radiation (X-rays) useful in the process of this invention is produced when a metal target (e.g., gold or tungsten) is bombarded by electrons possessing appropriate energy, e.g., 0.1 mev. In addition to X-rays produced as indicated above, ionizing electromagnetic radiation suitable for carrying out the process of the invention may be obtained from a nuclear reactor ("pile") or from natural or artificial radioactive material, for example, cobalt 60.

The does rate ("intensity" of dose) is not critical, being primarily a matter of available equipment. In general, high dose rates are preferred as promoting higher throughput.

Efficiency of dose utilization will usually be improved by keeping the fiber and excess monomer mixture in contact for an extended time after irradiation, with either the two-step or one-step process. This will provide maximum opportunity for the radical-initiated chains to grow.

Substrate shape

The product of the instant invention may be grafted before or after converting to its final (i.e., filament) shape, if the modifier is sufficiently stable thermally to stand the temperatures require for melt spinning. It is preferred to graft to the fiber. When the fiber is grafted, it may be grafted before or after drawing. It may be grafted as yarn, staple, flock, tow or fabric of knitted, felted, or woven construction.

Substrates

Substrates useful for the graft copolymer of this invention are the synthetic linear fiber-forming polyamides and polyesters. The polyamides are characterized by recurring amido radicals as an integral part of the polymer chain. The amido radicals are linked by divalent organic radicals which may be aliphatic, cycloaliphatic or aromatic, or mixtures of the above. Typical polyamides are poly(hexamethylene adipamide) referred herein as "66" nylon, polycaprolactam, poly(hexamethylene sebacamide), polyaminoundecanoamide, poly(hexamethylene isophthalamide), poly(2-methyl hexamethylene terephthalamide), poly(meta-xylylene adipamide), poly(para-xylylene sebacamide), poly(octamethylene oxalamide), and the polyamide from bis(4-aminocyclohexyl)methane and aliphatic acids such as dodecanedioic acid. Copolymers having two or more components, as well as polymer and copolymer mixtures of the above are also included.

In addition to the polyamides, the invention is especially applicable to the crystallizable, linear condensation polyesters. These comprise linear polyesters containing in the polymer carbonyloxy linking radicals,

Polymers containing oxycarbonyloxy radicals are comprehended with this group. The polymers should be of fiber-forming molecular weight; usually, this implies a relative viscosity of about 10 or higher as conventionally measured in solution in a solvent for the polymers. A good solvent for most of the linear condensation polyesters is a mixture of 58.8 parts of phenol and 41.2 parts of trichlorophenol. Copolyesters, terpolyesters, and the like are intended to be comprehended within the term "polyesters."

Examples of crystalliable, linear condensation polyesters include polyethylene terephthalate, polyethylene terephthalate/isophthalate (85/15), polyethylene terephthalate/5-(sodium sulfo)isophthalate (97/3), poly(p-hexahydroxylylene terephthalate), polyhydroxypivalic acid, poly(decahydronaphthalene-2,6-dimethylene 4,4'-bibenzoate), polyethylene 2,6- or 2,7-naphthalenedicarboxylate, and poly(bicyclohexl-4,4'-dimethylene-4,4'-bibenzoate), as well as many others. Preferably, the polyester is a linear glycol terephthalate polyester. By this is meant a linear condensation polyester derived from a glycol and an organic acid in which the glycol component is comprised substantially of a dihydroxy compound of a divalent saturated hydrocarbon radical containing from 2 to 10 carbon atoms and the acid component is at least about 75 mol percent terephthalic acid.

Utility

The graft copolymers bearing —$CF_2$— groups according to this invention have improved resistance to wetting, to oily soil and dry soil.

What is claimed is:
1. A graft copolymer textile comprising
   (a) a substrate of polyamides wherein the recurring amide linkages are an integral part of the polymer chain or polyesters wherein the recurring ester linkages are an integral part of the polymer chain and
   (b) grafted thereto, a compound selected from the group of saturated fluorocarbon alcohol, fluorcarbon alcohol acrylate, vinyl esters of fluorocarbon acid, vinyl substituted fluorocarbon esters, fluorocarbon vinyl ethers, vinyl fluoride or vinyl substituted fluorocarbon,
with the proviso that (1) the fluorocarbon portion of the molecule contain from 2 to 17

groups, (2) said compound having at least one hydrogen on a carbon atom, and (3) said compound be linked to the said substrate via carbon-carbon bonds.

2. A graft copolymer textile as defined in claim 1 where compound (b) is $HCF_2-(CF_2)_5-CH_2-OH$.

3. A graft copolymer textile as defined in claim 1 where compound (b) is an unsaturated fluorocarbon having at least 7

groups.

4. A graft copolymer textile as defined in claim 3 where compound (b) is 2,2,3,3-tetrafluorocyclobutylvinylethylene.

5. A graft copolymer textile as defined in claim 3 where compound (b) is alpha, alpha-dihydroperfluorooctyl acrylate.

6. A graft copolymer textile as defined in claim 3 where compound (b) is 2,3,8-trihydroperfluorohepten-2-oate.

7. A graft copolymer textile as defined in claim 3 where compound (b) is hexafluoropropene.

8. A graft copolymer textile as defined in claim 3 where compound (b) is vinyl perfluorooctanoate.

No references cited.

MURRAY TILLMAN, *Primary Examiner.*

P. LIEBERMAN, *Assistant Examiner.*